US010110923B2

(12) United States Patent
Zhang et al.

(10) Patent No.: US 10,110,923 B2
(45) Date of Patent: Oct. 23, 2018

(54) METHOD OF REFERENCE VIEW SELECTION FOR 3D VIDEO CODING

(71) Applicant: HFI INNOVATION INC., Zhubei, Hsinchu County (TW)

(72) Inventors: Na Zhang, Shangqiu (CN); Yi-Wen Chen, Taichung (TW); Jian-Liang Lin, Su'ao Township, Yilan County (TW); Jicheng An, Beijing (CN); Kai Zhang, Beijing (CN)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 359 days.

(21) Appl. No.: 14/784,675

(22) PCT Filed: Jun. 27, 2014

(86) PCT No.: PCT/CN2014/080997
§ 371 (c)(1),
(2) Date: Oct. 15, 2015

(87) PCT Pub. No.: WO2015/007148
PCT Pub. Date: Jan. 22, 2015

(65) Prior Publication Data
US 2016/0080774 A1   Mar. 17, 2016

(30) Foreign Application Priority Data

Jul. 19, 2013 (WO) ................ PCT/CN2013/079715

(51) Int. Cl.
*H04N 19/597*   (2014.01)
*H04N 19/513*   (2014.01)
(Continued)

(52) U.S. Cl.
CPC ......... *H04N 19/597* (2014.11); *H04N 19/105* (2014.11); *H04N 19/176* (2014.11);
(Continued)

(58) Field of Classification Search
None
See application file for complete search history.

(56) References Cited

U.S. PATENT DOCUMENTS

| 9,609,347 B2 * | 3/2017 | Thirumalai .......... H04N 19/597 |
| 2010/0091858 A1 * | 4/2010 | Yang .................... H04N 19/597 375/240.13 |

(Continued)

FOREIGN PATENT DOCUMENTS

| CN | 102946536 | 2/2013 |
| WO | WO 2012/171442 | 12/2012 |

(Continued)

OTHER PUBLICATIONS

F. Zou, D. Tian, and A. Vetro, "View synthesis prediction using skip and merge candidates for HEVC-based 3D video coding," in Circuits and Systems (ISCAS), 2013 IEEE International Symposium on, May 2013.*

(Continued)

*Primary Examiner* — Mohammad J Rahman
(74) *Attorney, Agent, or Firm* — McClure, Qualey & Rodack, LLP

(57) ABSTRACT

A method of deriving VSP (View Synthesis Prediction) Merge candidates with aligned inter-view reference pictures is disclosed. The method generates a second Disparity Vector (DV) using a scaled DV derived from Neighboring Block Disparity Vector (NBDV) of the current block. A method of deriving one or more inter-view DV Merge candidates with aligned DV and associated inter-view reference pictures is also disclosed. The inter-view reference picture pointed by the DV derived from Depth oriented NBDV (DoNBDV) is used as the reference picture and the DV derived from DoNBDV is used as the DV for inter-view DV Merge candidate. Furthermore, a method of deriving temporal DV for NBDV is disclosed, where if the temporal (Continued)

neighboring block has a DV existing, the DV is used as an available DV for the current CU only if the associated inter-view reference picture exists in the reference lists of the current CU.

16 Claims, 5 Drawing Sheets

(51) Int. Cl.
    *H04N 19/30*     (2014.01)
    *H04N 19/176*     (2014.01)
    *H04N 19/44*     (2014.01)
    *H04N 19/105*     (2014.01)

(52) U.S. Cl.
    CPC ............ *H04N 19/30* (2014.11); *H04N 19/44* (2014.11); *H04N 19/513* (2014.11)

(56) References Cited

U.S. PATENT DOCUMENTS

| | | | |
|---|---|---|---|
| 2013/0176390 A1* | 7/2013 | Chen ................... | H04N 19/597 348/43 |
| 2013/0343459 A1* | 12/2013 | Bici ................. | H04N 19/00684 375/240.16 |
| 2014/0078251 A1* | 3/2014 | Kang ................. | H04N 13/0048 348/43 |
| 2014/0307795 A1* | 10/2014 | Chen ................... | H04N 19/597 375/240.16 |
| 2015/0030073 A1* | 1/2015 | Chen ................... | H04N 19/597 375/240.16 |
| 2015/0085930 A1* | 3/2015 | Zhang .................. | H04N 19/136 375/240.15 |
| 2015/0215640 A1 | 7/2015 | Lin | |
| 2016/0029045 A1* | 1/2016 | An ....................... | H04N 19/597 375/240.24 |
| 2016/0165263 A1* | 6/2016 | Zhang .................. | H04N 19/597 375/240.12 |

FOREIGN PATENT DOCUMENTS

| | | |
|---|---|---|
| WO | WO 2013/030456 | 3/2013 |
| WO | WO 2013/103879 | 7/2013 |

OTHER PUBLICATIONS

Tech, G., et al.; "3D-HEVC Test Model 4;" International Organisation for Standardisation; Apr. 2013; pp. 1-54.

Zhang, N., et al.; "3D-CE2.11 related: Bug fix for issues caused by reference view selection;" Joint Collaborative Team on 3D Video Coding Extensions of ITU-T SG 16 WP 3 and ISO/IEC JTC 1/SC 29/WG 11; Jul.-Aug. 2013; pp. 1-6.

International Search Report and written opinion dated Sep. 29, 2014, issued in application No. PCT/CN2014/080997.

* cited by examiner

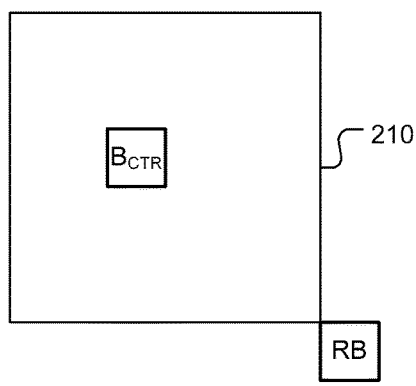
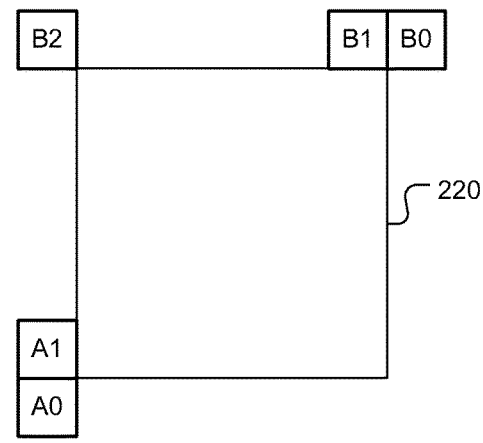
Fig. 2A  Fig. 2B
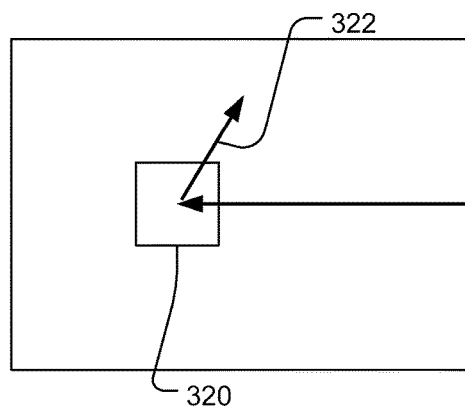
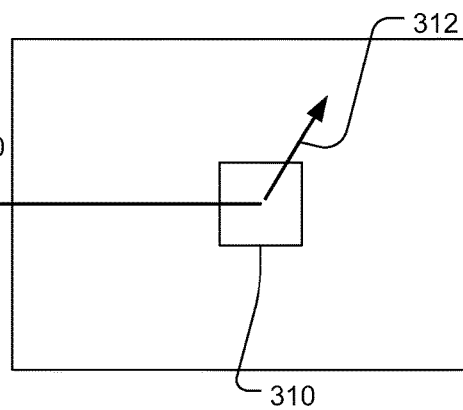
Inter-view reference picture         Dependent view
Fig. 3

METHOD OF REFERENCE VIEW SELECTION FOR 3D VIDEO CODING

CROSS REFERENCE TO RELATED APPLICATIONS

The present invention is a National Phase Application of PCT Application No. PCT/CN2014/080997, filed on Jun. 27, 2014, which is a Continuation-In-Part of PCT Patent Application, Ser. No. PCT/CN2013/079715, filed on Jul. 19, 2013, entitled "Reference View Selection for 3D Video Coding". The PCT Patent Applications are hereby incorporated by reference in their entirety.

FIELD OF THE INVENTION

The present invention relates to three-dimensional video coding. In particular, the present invention relates to disparity vector (DV) and reference picture derivation associated with various three-dimensional coding tools.

BACKGROUND AND RELATED ART 3D video coding has been developed for conveying video data of multiple views simultaneously captured by multiple cameras. Since the cameras capture the same scene from different viewpoints, multi-view video data contains a large amount of inter-view redundancy. To exploit the inter-view redundancy, various coding tools utilizing disparity vectors (DVs) have been integrated to conventional 3D-HEVC (High Efficiency Video Coding) or 3D-AVC (Advanced Video Coding) codec as follows.

Disparity-Compensated Prediction (DCP)

To share the previously encoded texture information of reference views, the well-known technique of disparity-compensated prediction (DCP) has been added as an alternative to motion-compensated prediction (MCP). MCP refers to an inter-picture prediction that uses already coded pictures of the same view in a different access unit (i.e., different time), while DCP refers to an inter-picture prediction that uses already coded pictures of other views in the same access unit, as illustrated in FIG. 1. The vector (110) used for DCP is termed as disparity vector (DV), which is analog to the motion vector (MV) used in MCP. FIG. 1 illustrates three MVs (120, 130 and 140) associated with MCP. Moreover, the DV of a DCP block can also be predicted by the disparity vector predictor (DVP) candidate derived from neighboring blocks or the temporal collocated blocks that also use inter-view reference pictures.

Inter-View Motion Prediction (IVMP)

To share the previously encoded motion information of reference views, the inter-view motion prediction (IVMP) is employed. For deriving candidate motion parameters for a current block in a dependent view, a DV for a current block is firstly derived, and then the prediction block in the already coded picture in the reference view is located by adding the DV to the location of the current block. If the prediction block is coded using MCP, the associated motion parameters can be used as candidate motion parameters for the current block in the current view. The derived DV can also be directly used as an inter-view DV Merge candidate for current PU. It is noted that, in the current draft standard, when storing the derived DV as an inter-view DV Merge candidate, the associated reference index is related to the first inter-view reference picture in each reference picture list. This may introduce misalignment between the derived DV and the associated reference picture since the inter-view reference picture pointed by the derived DV may not be the same as the associated reference index related to the first inter-view reference picture in each reference picture list.

Inter-View Residual Prediction (IVRP)

To share the previously encoded residual information of reference views, the residual signal for current block can be predicted by the residual signal of the corresponding blocks in reference views. The corresponding block in a reference view is located by a DV.

View Synthesis Prediction (VSP)

View synthesis prediction (VSP) is a technique to remove inter-view redundancies among video signal from different viewpoints, in which synthetic signal is used as reference to predict a current picture.

In 3D-HEVC test model, HTM-7.0, there exists a process to derive a disparity vector predictor, known as NBDV (Neighboring Block Disparity Vector). The disparity vector derived from NBDV is then used to fetch a depth block in the depth image of the reference view. The fetched depth block has the same size of the current prediction unit (PU), and it will be used to perform backward warping for the current PU.

In addition, the warping operation may be performed at a sub-PU level precision, such as 2×2 or 4×4 blocks. A maximum depth value is selected for a sub-PU block to convert to a converted DV and used for warping all the pixels in the sub-PU block. The VSP is only applied for coding the texture component.

In current implementation, VSP prediction is added as a new merging candidate to signal the use of VSP prediction. In such a way, a VSP block may be coded in Skip mode without transmitting any residual, or a Merge block with residual information coded. In both modes, the motion information will be derived from the VSP candidate.

When a picture is coded as B picture and the current block is signaled as VSP predicted, the following steps are applied to determine the prediction direction of VSP.

Obtain the view index refViewIdxNBDV of the derived disparity vector from NBDV;

Obtain the reference picture list RefPicListNBDV (either RefPicList0 or RefPicList1) that is associated with the reference picture with view index refViewIdxNBDV;

Check the availability of an inter-view reference picture with view index refViewIdx which is not equal to refViewIdxNBDV in the reference picture list other than RefPicListNBDV;

If such a different inter-view reference picture is found, bi-directional VSP is applied. The depth block from view index refViewIdxNBDV is used as the current block's depth information (in case of texture-first coding order), and the two different inter-view reference pictures (one from each reference picture list) are accessed via backward warping process and further weighted to achieve the final backward VSP predictor; and Otherwise, uni-directional VSP is applied with RefPicListNBDV as the reference picture list for prediction.

When a picture is coded as P picture and the current prediction block is using VSP, uni-directional VSP is applied. It is noted that, the VSP process in the current 3D-HEVC draft and in the software HTM-7.0 are different. The two different VSP operations are described as follow.

VSP in 3D-HEVC Working Draft (HTM-7.0)

Derivation process for a VSP Merge candidate:

Obtain the reference picture list RefPicListX (either RefPicList0 or RefPicList1) which includes an inter-view reference picture with ViewIdx of RefPicListX[refIdxLX] is equal to the refViewIdxNBDV. If so, predFlagLXVSP is set to 1, mvLXVSP is set to NBDV and refIdxLXVSP is set to refIdxLX;

Check if an inter-view reference picture exists in RefPicListY (Y=1−X) with ViewIdx of RefPicListY[refIdxLY] different from refViewIdxNBDV. If so, predFlagLYVSP is set to 1, mvLYVSP is set to NBDV and refIdxLYVSP is set to refIdxLY.

Decoding process for inter prediction samples when VSP mode flag is true:

For X in the range from 0 to 1:
If predFlagLXVSP is equal to 1, the inter-view reference picture or pictures of RefPicListX[refIdxLX] are accessed via backward warping process.

View synthesis prediction process:

For X in the range from 0 to 1:
The texture picture is derived by RefPicListX[refIdxLX]; and
The disparity vector mvLX is then used to fetch a depth block in the depth image of the reference view with view index refViewIdxNBDV of the current CU.

VSP in HTM7.0

Derivation process for a view synthesis prediction Merge candidate:
predFlagL0VSP is set to 1, and predFlagL1VSP is set to 0;
If there exists an inter-view reference picture in RefPicList0 and the reference picture, RefPicList0 (refIdxL0) is the first inter-view reference picture in RefPicList0, mvL0VSP is set to NBDV, and refIdxL0 VSP is set to refIdxL0; and
Similarly, if there exists an inter-view reference picture in RefPicList1 and the reference picture, RefPicList1 (refIdxL1) is the first inter-view reference picture in RefPicList1, mvL1VSP is set to NBDV, and refIdxL1 VSP is set to refIdxL1.

Decoding process for inter prediction samples when VSP mode flag is true:
RefPicListX is the first reference picture list which includes an inter-view reference picture, refIdxLXVSP is associated with the first inter-view reference picture in RefPicListX, and then backward warping process is performed in this direction; and
For B-slice, an additional test to determine whether B-VSP is performed. The additional test checks if the inter-view reference picture in list RefPicListY (Y=1−X) with view index is different from ViewIdx of RefPicListX[refIdxLXVSP].

View synthesis prediction process:
RefPicListX is the first reference picture list which includes an inter-view reference picture, refIdxLXVSP is associated with the first inter-view reference picture in RefPicListX, the disparity vector mvLX is then used to fetch a depth block in the depth image RefPicListX(refIdxLXVSP); and
The reference index of the texture picture is derived using a process similar to that specified in the decoding process for inter prediction samples when VSP mode flag is true.

The DV is critical in 3D video coding for inter-view motion prediction since inter-view residual prediction, disparity-compensated prediction (DCP), view synthesis prediction (VSP) needs the DV to indicate the correspondence between inter-view pictures. The DV derivation utilized in current test model of 3D-HEVC (HTM-7.0) is described as follow.

DV Derivation in HTM-7.0

Currently, except for the DV for DCP, the DVs used for the other coding tools are derived using either the neighboring block disparity vector (NBDV) or the depth oriented neighboring block disparity vector (DoNBDV) as described below.

Neighboring Block Disparity Vector (NBDV)

First, the temporal neighboring blocks located in a temporal collocated picture shown in FIG. 2A, are scanned in the following order: right-bottom block (RB) followed by the center block ($B_{CTR}$) of the collocated block (210). Once a block is identified as having a DV, the checking process will be terminated. It is noted that, in the current design, two collocated pictures will be checked. Deriving DV from a temporal neighboring block of a collocated picture, whenever a temporal neighboring block is identified as having a DV, the DV is directly used as the derived DV for current CU regardless whether an inter-view reference picture with the view index of the inter-view reference picture pointed by the DV exists or not in either of the reference list of current CU.

If no DV can be found in temporal neighboring blocks, the spatial neighboring blocks of the current block (220) are checked in a given order (A1, B1, B0, A0, B2) as shown in FIG. 2B.

If DCP coded block is not found in the above mentioned spatial and temporal neighboring blocks, the disparity information obtained from spatial neighboring DV-MCP blocks are used. FIG. 3 shows an example of the DV-MCP block whose motion is predicted from a corresponding block in the inter-view reference picture where the location of the corresponding blocks is determined according to a disparity vector. In FIG. 3, a corresponding block 320 in an inter-view reference picture for a current block 310 in a dependent view is determined based on a disparity vector 330. The disparity vector used in the DV-MCP block represents a motion correspondence between the current and inter-view reference picture.

To indicate whether a MCP block is DV-MCP coded or not and to save the disparity vector used for the inter-view motion parameters prediction, two variables are added to store the motion vector information of each block:
dvMcpFlag, and
dvMcpDisparity (only horizontal component is stored).

When dvMcpFlag is equal to 1, the dvMcpDisparity is set to the disparity vector used for the inter-view motion parameter prediction. In the AMVP and Merge candidate list construction process, the dvMcpFlag of the candidate is set to 1 only for the candidate generated by inter-view motion parameter prediction in Merge mode and is set to 0 for others. It is noted that, if neither DCP coded blocks nor DV-MCP coded blocks are found in the above mentioned spatial and temporal neighboring blocks, a zero vector can be used as a default disparity vector.

Depth Oriented Neighboring Block Disparity Vector (DoNBDV)

In the DoNBDV scheme, NBDV is used to retrieve the virtual depth in the reference view to derive a refined DV. To be specific, the refined DV is converted from the maximum depth in the virtual depth block which is located by the DV derived using NBDV.

In HEVC, two different modes for signaling the motion parameters for a block are specified. In the first mode, which is referred to as adaptive motion vector prediction (AMVP) mode, the number of motion hypotheses, the reference indices, the motion vector differences, and indications specifying the used motion vector predictors are coded in the bitstream. The second mode is referred to as Merge mode. For this mode, only an indication is coded, which signals the set of motion parameters that are used for the block. It is noted that, in the current design of 3D-HEVC, during collecting the motion hypotheses for AMVP, if the reference picture type of spatial neighboring block is same as the reference picture type of a current PU (inter-view or temporal) and the picture order count (POC) of the reference picture of spatial neighboring block is equal to the POC of the reference picture of the current PU, the motion information of spatial neighboring block is directly used as the motion hypothesis of the current PU.

Under the existing scheme, when the reference view is selectable similar to IBP (i.e., I-Picture, B-Picture and P-Picture) configuration, non-correspondence between DV and the inter-view reference picture may occur in the following 3D coding tools: the derived DV stored as a candidate DV for DCP, VSP and AMVP. There also exists an issue when deriving DV from the temporal neighbor block in the NBDV process. Therefore, it is desirable to develop new DV derivation process and reference picture selection process to overcome these issues.

BRIEF SUMMARY OF THE INVENTION

A method of deriving bi-directional VSP (View Synthesis Prediction) Merge candidates with aligned inter-view reference pictures for three-dimensional (3D) or multi-view coding according to an embodiment of the present invention is disclosed. A derived DV (Disparity Vector) is first determined for the current block, where the derived DV is in a first reference list and the derived DV points to a first-list inter-view reference picture in the first reference list with a first view index. A second-list inter-view reference picture in a second reference list with a second view index is derived, where the second reference list is different from the first reference list and the second view index is different from the first view index. When the second-list inter-view reference picture exists, a second DV pointing to the second-list inter-view reference picture is derived as a bi-directional VSP Merge candidate, where the second DV is derived based on the derived DV according to a DV conversion process. The current block is encoded or decoded using bi-directional Merge candidates including the bi-directional VSP Merge candidate, wherein bi-directional VSP is allowed.

The DV conversion process may correspond to DV scaling or depth-to-DV conversion. In the case of DV scaling, the second DV is derived based on the derived DV according to view order distance associated with the first view index and the second view index. In the case of depth-to-DV conversion, the second DV is converted from a maximum depth value selected from a depth block in a reference view, where the depth block is located using the derived DV. The derived DV can be determined using a NBDV (Neighboring Block Disparity Vector) process, where the derived DV is determined based on disparity vectors of neighboring blocks of the current block. The derived DV can also be determined using a DoNBDV (Depth oriented NBDV) process where a first DV is derived using the NBDV process, the first DV is used to access a depth block in a reference view, a converted DV is converted from a maximum depth value selected from the depth block, and the converted DV is used as the derived DV.

A method of deriving one or more inter-view DV Merge candidates with aligned DV and associated inter-view reference pictures for three-dimensional (3D) or multi-view coding according to an embodiment of the present invention is disclosed. A derived DV is derived based on a DV derivation process, where the derived DV is in a first reference list and the derived DV points to a first-list inter-view reference picture in the first reference list with a first view index. A first inter-view DV Merge candidate is derived by using a disparity value of the derived DV and an inter-view reference picture pointed by the derived DV. The current block is encoded or decoded using Merge candidates including the first inter-view DV Merge candidate. The derived DV can be derived using the NBDV or DoNBDV process. When the current block is coded using bi-prediction, a second-list inter-view reference picture in a second reference list with a second view index is derived, where the second reference list is different from the first reference list. A second DV pointing to the second-list inter-view reference picture combining a first DV pointing to the first-list inter-view reference picture is derived as a second inter-view DV Merge candidate, where the second DV is derived based on the derived DV according to a DV conversion process. The second DV is included in the Merge candidates. The DV conversion process can be based on DV scaling or depth-to-DV conversion. In another embodiment, a second-list inter-view reference picture in a second reference list with a second view index is derived, where the second reference list is different from the first reference list and the second view index is different from the first view index. A second DV pointing to the second-list inter-view reference picture is derived as a second inter-view DV Merge candidate, where the second DV is derived based on the derived DV according to a DV conversion process. The second DV is included in the Merge candidates. The DV conversion process can be based on DV scaling or depth-to-DV conversion.

A method of deriving temporal DV for NBDV is disclosed. One or more collocated blocks in a temporal reference picture corresponding to the current block are determined. The collocated blocks are searched for an available DV. A test is performed regarding whether the available DV points to an inter-view reference picture in a reference list of the current block. If so, the available DV is designated as a temporal NBDV. The current block is encoded or decoded using the temporal NBDV.

BRIEF DESCRIPTION OF THE DRAWINGS

FIGS. 2A-2B illustrate examples of temporal and spatial neighboring blocks respectively used for the NBDV (Neighboring Block Disparity Vector) process.

FIG. 3 illustrates an example of the DV-MCP block, where motion of the block is predicted from a corresponding block in the inter-view reference picture.

DETAILED DESCRIPTION OF THE INVENTION

Figure 1:
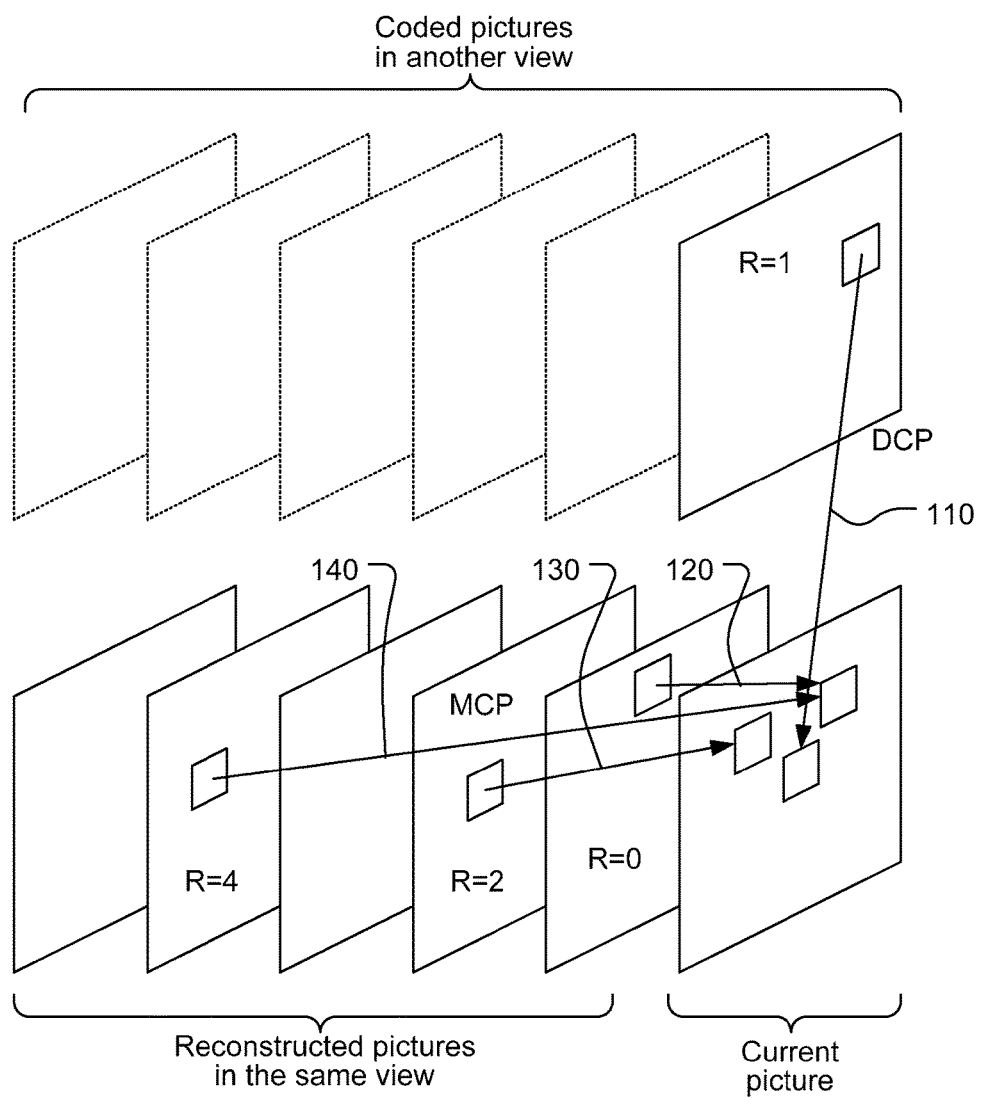
FIG. 1 illustrates an example of three dimensional coding systems using both motion compensated prediction (MCP) and disparity compensated prediction (DCP).

The following description is of the best-contemplated mode of carrying out the invention. This description is intended for the purpose of illustrating the general principles of the invention and it should not be construed as limitations to the present invention. The scope of the invention is best determined by reference to the appended claims.

First embodiment of the present invention derives the inter-view DV Merge candidate using a uni-directional candidate so that the disparity vector and associated reference picture of the inter-view DV is always aligned. The prediction direction of the inter-view DV Merge candidate is decided according to which prediction list that the derived DV belong to. For example, if the derived DV is a ListX DV, the prediction direction of the inter-view DV Merge candidate is set as ListX uni-prediction (X=0 or 1). The motion vector of the inter-view DV Merge candidate is set as the DV derived by any kind of DV derivation algorithm (e.g. NBDV, DoNBDV). Furthermore, the reference picture index of the inter-view DV Merge candidate is set as the reference index of the derived DV. In this way, the disparity vector and the associated reference picture of the inter-view DV will be aligned.

In the second embodiment, the inter-view DV Merge candidate is derived for a bi-directional candidate. In this case, the other DV points to the other inter-view reference picture different from the inter-view reference picture pointed by the NBDV can be derived using depth-to-DV conversion or DV scaling. The uni-directional candidate derivation according to the first embodiment is applied first to derive the first inter-view DV Merge candidate. The derived DV is designated as a List X DV. Then a test is performed to check whether the current slice is a B-slice and whether an inter-view reference picture RefPicAdditional exists in the reference picture list Y (Y=1−X) of current PU with a view index different from the view index of the reference picture pointed by the originally derived DV (denoted as refViewIdxOriginal). If the inter-view reference picture RefPicAdditional exists, the prediction direction of the inter-view DV candidate is set to bi-prediction; the disparity vector of the inter-view DV Merge candidate in ListY (Y=1−X) is derived from the depth-to-DV conversion or DV scaling. When the depth-to-DV conversion is used, the target reference picture is set to the RefPicAdditional pointed by the associated depth block. The associated depth block can be retrieved from the inter-view reference depth picture using the derived DV. When DV scaling is used, the prediction direction of the inter-view DV candidate is set to bi-prediction. The disparity vector of the inter-view DV Merge candidate in ListY (Y=1−X) is derived by DV scaling according to the view order distance associated with the inter-view reference picture and the current picture.

Refinement of VSP

In the third embodiment of the present invention, the VSP is stored as a uni-directional Merge candidate as follows:
  Derivation process for a view synthesis prediction (VSP) Merge candidate:
    The prediction direction of the VSP candidate is decided according to which prediction list that the derived DV belong to. For example, if the derived DV is a ListX DV, the prediction direction of the inter-view DV candidate is set as ListX uni-prediction (X=0 or 1); and the DV and the reference index of the VSP candidate is set to the derived DV and its associated reference index. The derived DV can be the DV derived by any method of DV derivation algorithms such as NBDV or DoNBDV.
  Decoding process for inter prediction samples when VSP candidate is selected:
    RefPicListX is decided by the prediction direction of the VSP merging candidate, where X is 0 if prediction direction is 1 and X is 1 if prediction direction is 2. refIdxLXVSP is set to refIdxLX and then the VSP process is performed in this direction.
    For B-slice, an additional process is invoked to find an inter-view reference picture in RefPicListY (Y=1−X) with view index not equal to the view index of the reference picture pointed by the derived DV. If such inter-view reference picture exists, the VSP process is also invoked in this direction. The ListX VSP and ListY VSP are combined to form a bi-prediction VSP (Bi-VSP).
  View synthesis prediction process:
    RefPicListX is decided by the prediction direction of the VSP merging candidate, where X is 0 if prediction direction is 1 and X is 1 if prediction direction is 2. The disparity vector mvLX is then used to fetch a depth block in the depth image of RefPicListX (refIdxLX).
    The reference index of the texture reference picture for VSP is derived using a process similar to the process specified in decoding process for inter prediction samples when VSP candidate is selected.

In the fourth embodiment of the present invention, VSP is stored as a bi-directional Merge candidate, where the other DV pointing to the other inter-view reference picture different from the inter-view reference picture pointed by the NBDV is derived by depth-to-DV conversion or by DV scaling.

The VSP process for bi-directional Merge candidate is shown as follows.
  Derivation process for a VSP Merge candidate:
    The prediction direction of the VSP candidate is decided according to which prediction list that the derived DV belong to. For example, if the derived DV is a ListX DV, the prediction direction of the inter-view DV candidate is set as ListX uni-prediction (X=0 or 1). The DV and the reference index of the VSP candidate is set to the derived DV and its associated reference index. The derived DV can be the DV derived by any DV derivation algorithm such as NBDV or DoNBDV.
    For B-slice, an additional process is invoked to find an inter-view reference picture RefPicAdditional in RefPicListY (Y=1−X) with view index not equal to the view index of the reference picture pointed by the derived DV. If such inter-view reference picture exists, the prediction direction of the VSP candidate is set to bi-prediction, the disparity vector of the VSP candidate in ListY (Y=1−X) is derived from depth-to-DV conversion or DV scaling. When the depth-to-DV conversion is used, the target reference picture is set to the RefPicAdditional pointed by the associated depth block. The associated depth block can be retrieved from the inter-view reference depth picture using the derived DV. When DV scaling is used, the prediction direction of the inter-view DV candidate is set to bi-prediction. The disparity vector of the inter-view DV Merge candidate in ListY (Y=1−X) is derived by DV scaling according to the view order distance associated with the inter-view reference picture and the current picture.

The VSP direction of the VSP merging candidate is X. Decoding process for inter prediction samples when VSP mode flag is true is as follow:

For X in the range of 0 to 1:
 If predFlagLXVSP is equal to 1, the inter-view reference picture of RefPicListX[refIdxLX] is accessed via the VSP process.

View synthesis prediction process:

For X in the range of 0 to 1:
 The texture picture is derived by RefPicListX[refIdxLX];
 D is the value of the VSP direction, the disparity vector mvLD is then used to fetch a depth block in the depth image of the reference view with view index ViewIdx (RefPicListD[refIdxLD]).

Validate the DV Derived from the Temporal Neighbor Block

In the fifth embodiment, during DV derivation from a temporal neighbor block of a collocated picture, if one temporal neighbor block is identified as having a DV, the DV can be used as the derived DV for current CU/PU only when there is an inter-view reference picture with the view index of the inter-view reference picture pointed by the DV exists in the reference lists of current CU/PU.

Refined Process for Deriving Spatial MVPs for AMVP

In the sixth embodiment, during spatial MVPs derivation for AMVP, the view index should be involved. For example, when the reference picture type of spatial neighboring block is same as the reference picture type of the current PU (inter-view or temporal), the picture order count (POC) of the reference picture of spatial neighboring block is equal to the POC of the reference picture of current PU and the view index of the reference picture of the spatial neighboring block is equal to the view index of the reference picture of current PU, the motion information of the spatial neighboring block can be directly used as the candidate MVP of current PU.

As mentioned earlier, the present invention is intended to overcome various issues associated with the existing draft systems for 3D video coding. It is anticipated to result in performance improvement for a system incorporating embodiments of the present invention. The performance of a 3D video coding system incorporating all embodiments listed above is compared to the performance of a conventional system based on HTM-7.0 (High Efficiency Video Coding, HEVC Test Model version 7.0) as shown in Table 1. The performance comparison is based on different sets of test data listed in the first column. The BD-rate differences are shown for texture pictures in view 1 (video 1) and view 2 (video 2). A negative value in the BD-rate implies that the present invention has a better performance. As shown in Table 1, BD-rate measure for view 2 incurs 3.9% performance improvement compared to the conventional HTM-7.0. The BD-rate measure for texture video only (video/video bitrate), the total bitrate (texture bitrate and depth bitrate) and the total bitrate for coded and synthesized video (Synth/total bitrate) also shows slight improvement (0.6 to 1.1%). The processing times (encoding time, decoding time and rendering time) are about the same.

TABLE 1

| | Video 0 | Video 1 | Video 2 | Video PSNR/ video bitrate | Video PSNR/ total bitrate | Synth PSNR/ total bitrate | Enc time | Dec time | Ren time |
|---|---|---|---|---|---|---|---|---|---|
| Balloons | 0.0% | 0.1% | −4.9% | −0.9% | −1.4% | −1.6% | 99.6% | 100.7% | 100.3% |
| Kendo | 0.0% | −0.4% | −3.6% | −0.7% | −0.7% | −0.7% | 99.6% | 100.8% | 101.2% |
| NewspaperCC | 0.0% | 0.0% | −4.9% | −0.8% | −0.7% | −3.0% | 98.7% | 102.5% | 101.2% |
| GhostTownFly | 0.0% | 0.6% | −4.8% | −0.4% | −0.4% | −0.6% | 98.7% | 103.8% | 99.3% |
| PoznanHall2 | 0.0% | −0.3% | −3.1% | −0.7% | −0.6% | −0.7% | 99.7% | 103.9% | 98.3% |
| PoznanStreet | 0.0% | −0.5% | −2.3% | −0.5% | −0.5% | −0.5% | 99.2% | 103.1% | 99.5% |
| UndoDancer | 0.0% | 0.5% | −4.1% | −0.4% | −0.4% | −0.9% | 99.2% | 98.4% | 97.6% |
| 1024 × 768 | 0.0% | −0.1% | −4.5% | −0.8% | −0.9% | −1.8% | 99.3% | 101.3% | 100.9% |
| 1920 × 1088 | 0.0% | 0.1% | −3.5% | −0.5% | −0.5% | −0.7% | 99.2% | 102.3% | 98.7% |
| average | 0.0% | 0.0% | −3.9% | −0.6% | −0.7% | −1.1% | 99.2% | 101.9% | 99.6% |

Figure 4:
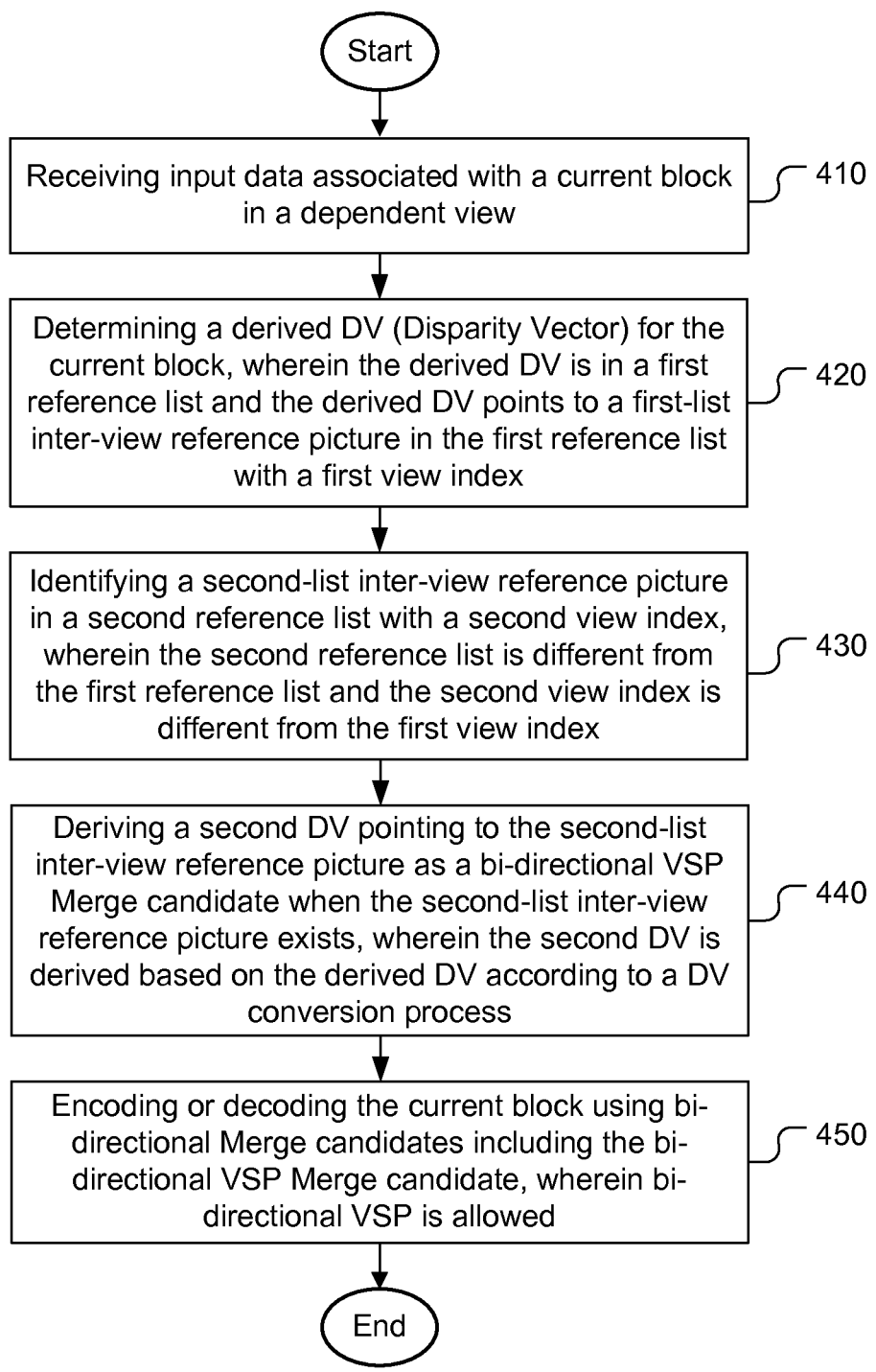
FIG. 4 illustrates an exemplary flowchart of a three-dimensional video coding system incorporating an embodiment of the present invention to derive bi-directional VSP (View Synthesis Prediction) Merge candidates with aligned DV and associated inter-view reference picture.

FIG. 4 illustrates an exemplary flowchart of three-dimensional video coding system incorporating an embodiment of the present invention to derive bi-directional VSP (View Synthesis Prediction) Merge candidates with aligned DV and associated inter-view reference picture. The system receives input data associated with a current block as shown in step 410. For encoding, the input data corresponds to texture data to be encoded. For decoding, the input data corresponds to coded texture data to be decoded. The input data may be retrieved from memory (e.g., computer memory, buffer (RAM or DRAM) or other media) or from a processor. A derived DV (Disparity Vector) for the current block is determined in step 420, where the derived DV is in a first reference list and the derived DV points to a first-list inter-view reference picture in the first reference list with a first view index. A second-list inter-view reference picture in a second reference list with a second view index is identified in step 430, where the second reference list is different from the first reference list and the second view index is different from the first view index. When the second-list inter-view reference picture exists, a second DV pointing to the second-list inter-view reference picture is derived as a bi-directional VSP Merge candidate in step 440, where the second DV is derived based on the derived DV according to a DV conversion process. The current block is encoded or decoded using bi-directional Merge candidates including the bi-directional VSP Merge candidate as shown in step 450, wherein bi-directional VSP is allowed.

Figure 5:
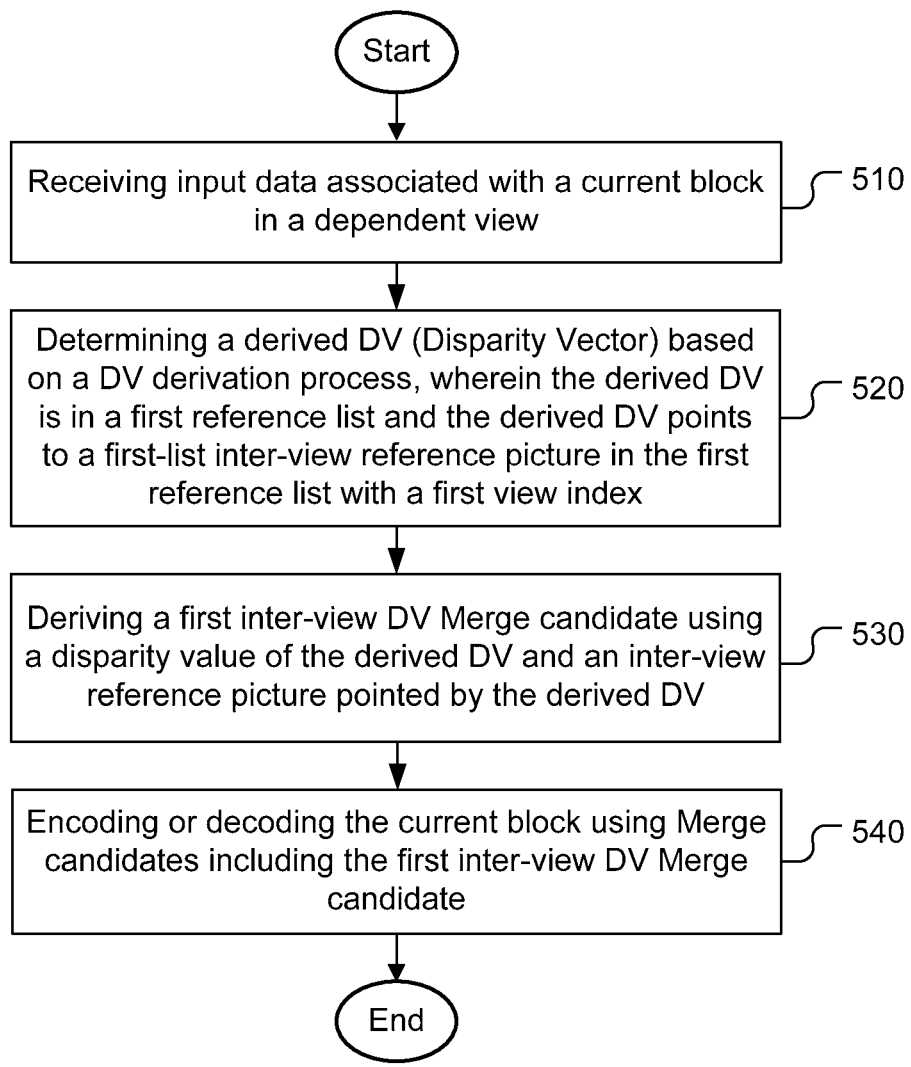
FIG. 5 illustrates an exemplary flowchart of a three-dimensional video coding system incorporating an embodiment of the present invention to derive one or more inter-view DV Merge candidates with aligned DV and associated inter-view reference picture.

FIG. 5 illustrates an exemplary flowchart of a three-dimensional video coding system incorporating an embodiment of the present invention to derive one or more inter-view DV Merge candidates with aligned DV and associated inter-view reference picture. Input data associated with a current block in a dependent view is received in step 510. A derived DV (Disparity Vector) is determined based on a DV derivation process in step 520, where the derived DV is in a first reference list and the derived DV points to a first-list inter-view reference picture in the first reference list with a first view index. A first inter-view DV Merge candidate is derived using a disparity value of the derived DV and an inter-view reference picture pointed by the derived DV in step 530. The current block is encoded or decoded using Merge candidates including the first inter-view DV Merge candidate in step 540.

Figure 6:
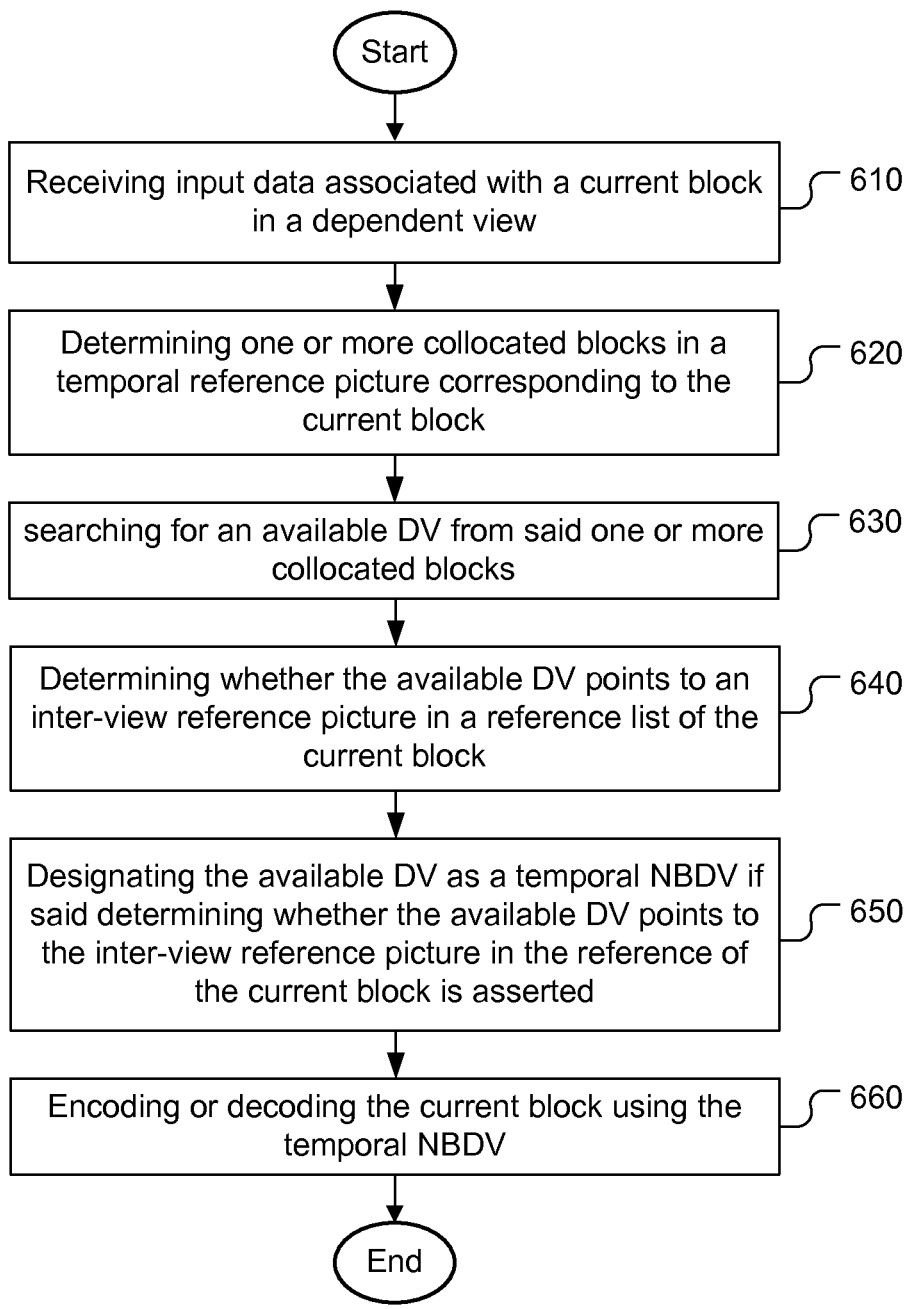
FIG. 6 illustrates an exemplary flowchart of a three-dimensional video coding system incorporating an embodiment of the present invention to derive temporal DV for NBDV with aligned DV and associated inter-view reference picture.

FIG. 6 illustrates an exemplary flowchart of a three-dimensional video coding system incorporating an embodiment of the present invention to derive temporal DV for NBDV with aligned DV and associated inter-view reference picture. Input data associated with a current block in a dependent view is received in step 610. One or more collocated blocks in a temporal reference picture corresponding to the current block are determined in step 620. The collocated blocks are searched for an available DV in step 630. A test regarding whether the available DV points to an inter-view reference picture in a reference list of the current block is performed in step 640. If the result is asserted, the available DV is designated as a temporal NBDV in step 650. The current block is encoded or decoded using the temporal NBDV in step 660.

The flowcharts shown above are intended to illustrate examples of DV and reference picture selection in 3D coding according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of a three-dimensional (3D) or multi-view coding system using a VSP (View Synthesis Prediction) Merge candidate, the method comprising:
   receiving input data associated with a current block in a dependent view;
   determining a derived DV (Disparity Vector) for the current block, wherein the derived DV is in a first reference list and the derived DV points to a first-list inter-view reference picture in the first reference list with a first view index;
   identifying a second-list inter-view reference picture in a second reference list with a second view index, wherein the second reference list is different from the first reference list and the second view index is different from the first view index;
   deriving a second DV pointing to the second-list inter-view reference picture as a bi-directional VSP Merge candidate when the second-list inter-view reference picture exists, wherein the second DV is derived based on the derived DV according to a DV conversion process; and
   encoding or decoding the current block using bi-directional Merge candidates including the bi-directional VSP Merge candidate, wherein bi-directional VSP is allowed.

2. The method of claim 1, wherein the DV conversion process corresponds to DV scaling, wherein the second DV is derived based on the derived DV according to view order distance associated with the first view index and the second view index.

3. The method of claim 1, wherein the DV conversion process corresponds to depth-to-disparity vector (depth-to-DV) conversion, wherein the second DV is converted from a maximum depth value selected from a depth block in a reference view, wherein the depth block is located using the derived DV.

4. The method of claim 1, wherein the derived DV is determined using a NBDV (Neighboring Block Disparity Vector) process, wherein the derived DV is determined based on disparity vectors of neighboring blocks of the current block.

5. The method of claim 1, wherein the derived DV is determined using a DoNBDV (Depth oriented Neighboring Block Disparity Vector) process, wherein a NBDV (Neighboring Block Disparity Vector) process is used to derive a first DV from disparity vectors of neighboring blocks of the current block, the first DV is used to access a depth block in a reference view, a converted DV is converted from a maximum depth value selected from the depth block, and the converted DV is provided as an output of the DoNBDV process.

6. The method of claim 1, wherein the second DV is stored as the bi-directional VSP Merge candidate.

7. A method of a three-dimensional (3D) or multi-view coding system using an inter-view DV (disparity vector) Merge candidate, the method comprising:
receiving input data associated with a current block in a dependent view;
determining a derived DV (Disparity Vector) based on a DV derivation process, wherein the derived DV is in a first reference list and the derived DV points to a first-list inter-view reference picture in the first reference list with a first view index;
deriving a first inter-view DV Merge candidate using a disparity value of the derived DV and an inter-view reference picture pointed by the derived DV; and
encoding or decoding the current block using Merge candidates including the first inter-view DV Merge candidate.

8. The method of claim 7, wherein the DV derivation process corresponds to a NBDV (neighboring block disparity vector) process, wherein the derived DV is determined based on disparity vectors of neighboring blocks of the current block.

9. The method of claim 7, wherein the DV derivation process corresponds to a DoNBDV (Depth oriented NBDV) process, wherein the derived DV is determined using a DoNBDV (Depth oriented Neighboring Block Disparity Vector) process, wherein a NBDV (Neighboring Block Disparity Vector) process is used to derive a first DV from disparity vectors of neighboring blocks of the current block, the first DV is used to access a depth block in a reference view, a converted DV is converted from a maximum depth value selected from the depth block, and the converted DV is provided as an output of the DoNBDV process.

10. The method of claim 7, wherein the derived DV is stored as a uni-directional inter-view DV candidate.

11. The method of claim 7, further comprising:
when the current block is coded using bi-prediction, identifying a second-list inter-view reference picture in a second reference list with a second view index, wherein the second reference list is different from the first reference list;
deriving a second DV pointing to the second-list inter-view reference picture combining a first DV pointing to the first-list inter-view reference picture as a second inter-view DV Merge candidate, wherein the second DV is derived based on the derived DV according to a DV conversion process; and
wherein the Merge candidates including the second inter-view DV Merge candidate.

12. The method of claim 11, wherein the second view index is different from the first view index.

13. The method of claim 11, wherein the second DV is stored as a bi-directional inter-view DV candidate.

14. The method of claim 11, wherein the DV conversion process corresponds to DV scaling, wherein the second DV is derived based on the derived DV according to view order distance associated with the first view index and the second view index.

15. The method of claim 11, wherein the DV conversion process corresponds to depth-to-DV conversion, wherein the second DV is converted from a maximum depth value selected from a depth block in a reference view, wherein the depth block is located using the derived DV.

16. A method of a three-dimensional (3D) or multi-view coding system using a DV (Disparity Vector) derived according to NBDV (Neighboring Block Disparity Vector) process, the method comprising:
receiving input data associated with a current block in a dependent view;
determining one or more collocated blocks in a temporal reference picture corresponding to the current block;
searching for an available DV from said one or more collocated blocks;
determining whether the available DV points to an inter-view reference picture in a reference list of the current block;
designating the available DV as a temporal NBDV if said determining whether the available DV points to the inter-view reference picture in the reference list of the current block is asserted; and
encoding or decoding the current block using the temporal NBDV.

* * * * *